United States Patent [19]
Dunn
[11] 4,222,052
[45] Sep. 9, 1980

[54] DATA TRANSMISSION SYSTEM

[76] Inventor: Ronald A. Dunn, 33 Kitchener Grove, East Preston, Australia

[21] Appl. No.: 860,675

[22] Filed: Dec. 15, 1977

[30] Foreign Application Priority Data

Dec. 15, 1976 [AU] Australia .............................. 8498/76

[51] Int. Cl.[2] .............................................. G01S 3/02
[52] U.S. Cl. .................................. 343/112 R; 340/505
[58] Field of Search ........................ 340/505, 508, 539; 343/112 R

[56] References Cited

U.S. PATENT DOCUMENTS

| | | | |
|---|---|---|---|
| 3,274,598 | 9/1966 | Cleeton | 343/100 ST X |
| 3,848,231 | 11/1974 | Wooton | 340/539 X |
| 3,925,763 | 12/1975 | Wadhwani et al. | 340/505 X |

*Primary Examiner*—Theodore M. Blum
*Attorney, Agent, or Firm*—J. Harold Nissen

[57] ABSTRACT

A computer controlled radio activated security and safety system suitable for interrogating a plurality of locations sequentially and for obtaining replies to indicate the condition of the locations and which is completely independent of any external connection between an interrogator location and an interrogatee location for interrogating a plurality of locations sequentially and obtaining replies to indicate the condition of the locations. The system comprises a computer center, at least one main transmitting and receiving station and at least one remote alarm unit which is adapted to monitor a predetermined parameter. The remote alarm unit is also provided with at least one receiver and transmitter, and the computer is adapted to interrogate the alarm unit with a predetermined digital signal and to monitor its reply, the reply being modified by any variation in the parameter.

13 Claims, 3 Drawing Figures

DATA TRANSMISSION SYSTEM

This invention relates to a computer controlled radio activated security and safety system.

In Australia the most common method of security and safety monitoring is by security guards who are either permanently located in buildings, and entrances to buildings or enclosures or who visit various premises normally in radio-controlled vehicles at regular intervals, normally in the evening. Such arrangements are only marginally satisfactory in that any person who knows the movements of the security guards can often defeat these and should, for example, a fire break out in a building it would only be luck if a security guard happened to be visiting that building at such a time as to be able to call the fire brigade rapidly.

There have been proposed at various times various electrical security methods which go from a very simple external alarm bell which is initiated when, say, a window or door was opened in an unusual and unauthorised manner to relatively complex systems which transmit signals along say telephone lines.

In the very simple version skilled persons can often jump part of the circuit so as to gain access and in the more complicated versions telephone lines are often accessable to any skilled person.

It is an object of this invention to provide an alarm system which mitigates the foregoing disadvantages and can provide a very rapid indication of the variations of a parameter and thus permit rapid steps to be taken to contact the required services.

It is a further object, in another aspect of the invention to provide means whereby small mobile transmitters can be located, normally by triangulation should an alarm emanate from one of these.

In the first aspect of the invention I provide a computer controlled radio activated security and safety system comprising a computer centre, at least one main transmitting and receiving station, at least one remote alarm unit which is to monitor a predetermined parameter, which remote alarm unit is also provided with at least one receiver and transmitter, the computer being adapted to interrogate the alarm unit with a predetermined digital signal and to monitor its reply, the reply being modified by any variation in the parameter.

Normally there can be a number of alarm units interrogated by the computer by the use of different digital signals and each alarm unit may itself have several transducers which each monitor a parameter, the transducers either being the same or different.

In the second aspect of the invention I combine in such a system means to locate a mobile transmitter which means includes a second receiver tuned to the frequency of the mobile transmitter and on a signal being received this is mixed to the reply from the alarm unit, further alarm units then being initiated by the computer each of which then measures the time for burst transmission from the mobile transmitter from which information which is returned to the computer under normal interrogation of the alarm unit the location of the mobile transmitter can be ascertained.

Thus it can be seen that say an armoured truck or other vehicle carrying valuables or even a case being carried by a courier can be provided with a very small transmitter which will have sufficient power to reach at least one of the adjacent alarm units and initiation of this transmitter provides a signal to the alarm unit which will return the signal to the base station and thus to the computer which, by interrogation of alarm units, including the one which originally forwarded the signal, can locate the position of the mobile transmitter by triangulation into a very small area.

In order that the invention may be more readily understood we shall refer to the accompanying drawings, which are block diagrams as it is believed that these are all that are necessary for a competent electronic engineer to effect the invention:

In these drawings:

FIG. 1 shows, generally, the physical arrangement of the invention. It must be kept in mind that security is the most important factor to be looked for in an invention of this type and thus, generally, duplication occurs wherever possible.

Figure 1:
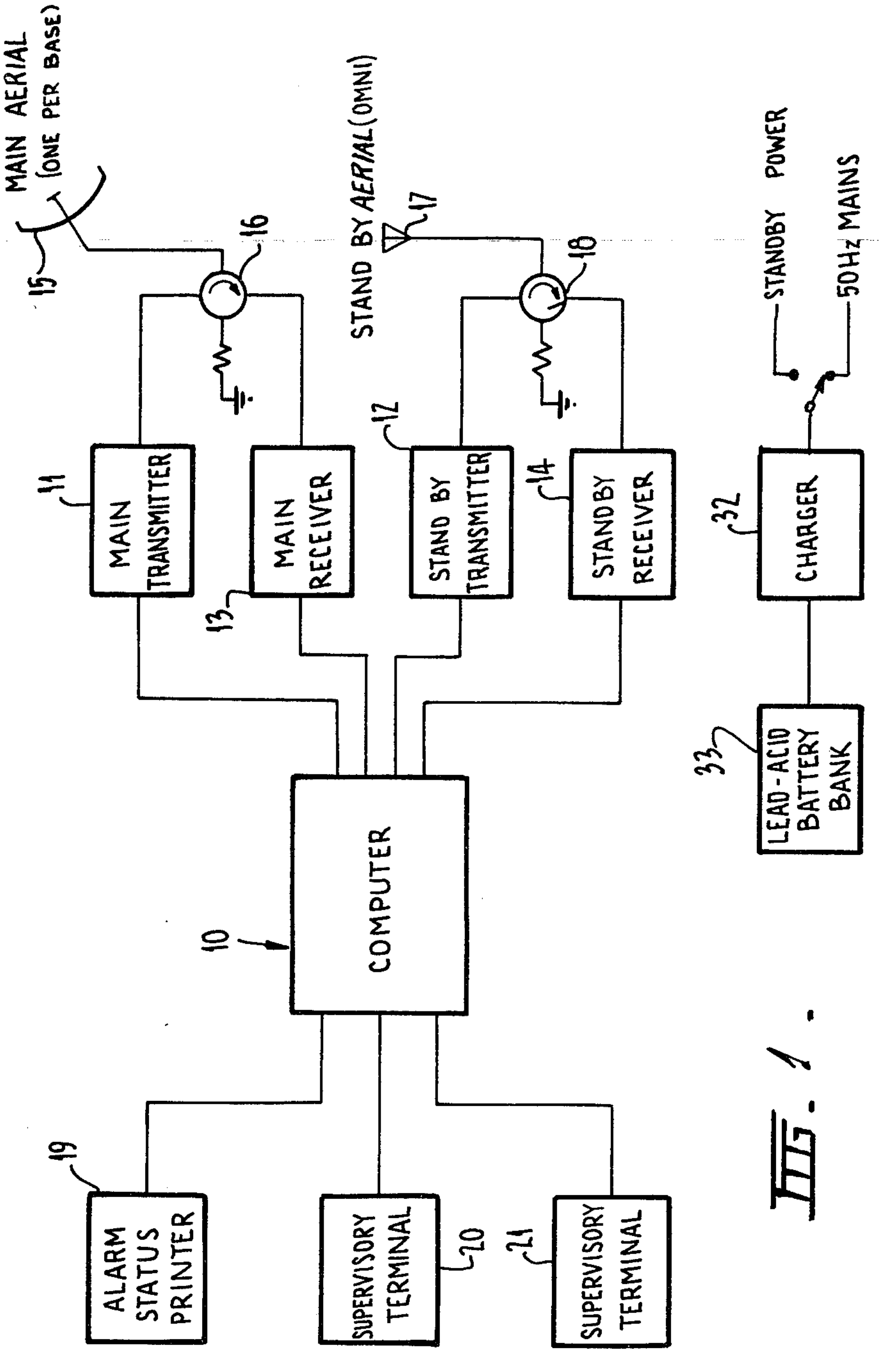
FIG. 1 shows the arrangement at the computer centre and the main transmitting and receiving station.

The centre of the system is the computer 10 which provides a digital interrogation signal and directs it through which transmitter it is to be transmitted and to which base it is to be addressed.

It can be seen that there are two transmitters 11,12 and two receivers 13,14, the transmitter 11 and receiver 13 being connected to a main aerial 15 by means of a switching circuit 16 and standby transmitter 12 and standby receiver 14 are connected to aerial 17 through switch 18. Under normal operating conditions the main transmitter and main receiver are used but should these develop a fault the computer 10 will immediately switch to the standby transmitter 12 and the standby receiver 14.

On receiving an alarm signal the computer carries out procedures which will be discussed hereinafter and there can be a print out of the alarm situation through printer 19 and, at the same time, it can be displayed on one or both of the terminals 20 and 21. The normal power is from the standard main and, under normal circumstances, the mains are also connected to a battery charger 32, which continually maintains charged a battery bank 33 and, should there be any power fault, there will be automatic switching to standby power.

Figure 2:
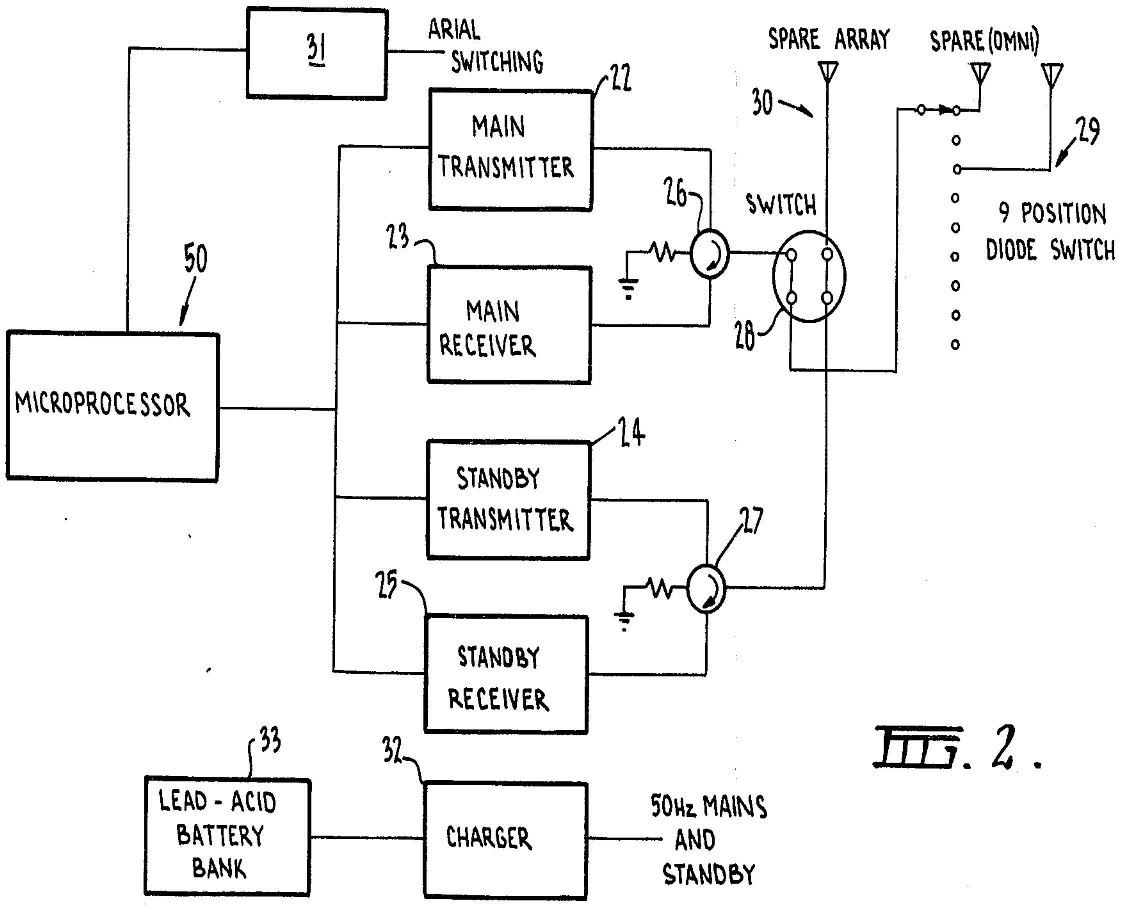
FIG. 2 shows the general arrangement at a base station which receives the signal from the computer centre.

The general arrangement of a base station, as illustrated in FIG. 2, can be considered similar in many respects to the computer and main station in that it has a main transmitter 22, a main receiver 23, standby transmitter 24 and standby receiver 25 which are connected to aerial arrays by switches 26 and 27 but the aerial arrangement differs in that there is also a further switch 28 by means of which the transmitter and receiver in operation may be switched to an helical or other array 29 which comprises directional units which can be individually switched to provide specific coverage depending upon an interrogation signal from the computer. There is also a spare array 30 which can be switched into position depending upon damage to or failure of the array 29.

Aerial switching and the other functions needed at the base station are achieved by the microprocessor 50 which receives a signal from the main transmitter through aerial 15, ascertains the address to which it is to be sent, switches the appropriate helical unit into circuit through aerial switch 31, operates switch 26 and 27 so that a transmitter is in circuit and then forwards the interrogation signal to the particular alarm unit to be interrogated. Again, the base station is normally operated through standard mains voltage but is provided with a charger 32 which is normally in circuit and which maintains a lead-acid battery bank 33 in a charged condition and there is automatic switching should the mains fail.

The alarm unit is designed around a digital circuit 34 (see FIG. 3) which has means whereby it can accept interrogation signals received through receiver 35, consider the status of a microwave or ultrasonic generator 36 or external detectors 37 and if these are satisfactory cause the signal to be transmitted through transmitter 38. As with the other two units, the alarm unit has an aerial 39 which is switched to the transmitter or the receiver by switch 40.

Also associated with the digital circuit 34 there is a keyboard 41 which can be used when the premises are occupied to test the operation of the circuit and can, if required, also cause the alarm unit to be activated and brought into circuit. The unit illustrated has an auxilliary receiver 42 which may have a separate aerial 43 or which may be connected back to the input of the aerial 39 to receiver 35. This receiver provides a tracking function as will be described hereinafter. Again the unit operates on mains power supply and is provided with a battery charger 32 and a battery or battery bank 33 which is normally maintained fully charged and is automatically connected into circuit on any failure of the mains power.

The unit also includes a code plug 46 which is basically that which distinguishes one alarm unit from another which ensures the digital circuit 34 only responds to signals properly addressed thereto.

Broadly the system relies upon the computer forming radio digital transmissions which are adapted to interrogate an alarm unit and receiving back from the unit the conditions applied either by the microwave or ultrasonic detector 36 or other external detectors 37 which may be heat sensitive or which may given an indication of unauthorised movement of, say, a door or window. Where an alarm signal is received, the computer reads out the relevant details on a supervisory terminal video screen 20,21 which are monitored and the monitor can then take the necessary action. At the same time, the permanent print out can be provided through the alarm status printer.

As the computer can rapidly interrogate a large number of alarm units it is designed to repeatedly sweep a predetermined number of slots which include various interrogation functions. The system works on a number of channels of different frequencies.

For normal interrogation I prefer to use three channels, channels A, B and C, but for special functions, which will be discussed, I use two extra channels D and E.

One of the slots is used for directing interrogation of the alarm units through channel A and other slots are used for the verification on channels B and C of alarm units.

Different slots can be used by day and by night as the security function can vary during these periods and still others can be divided into a number of different alarm units so that interrogation can occur every so many sweeps. The system is designed to sweep all of the alarm units within a given period of time. If required, certain alarm units can be interrogated more frequently than others by coding them into more slots.

The computer has an inbuilt facility which allows the sweep to be delayed by half a second by manual operation by a monitor. Whilst this causes alarm units to be interrogated half a second later than would otherwise be the case it does enable the monitor to check the situation in channels B and C if there is an alarm indication on channel A.

Each alarm unit has a pedestal stepping circuit which steps at half second intervals. Each time the alarm unit is interrogated under normal circumstances the pedestal pulse is synchronised on whichever channel it was called. Since these pedestal pulses are stepped automatically if the computer is delayed by half a second the alarm unit will have stepped to another channel and thereafter the interrogations will occur on the adjacent channel. Thus, if initially on channel A, the interrogations will occur on channel B and if a further half second delay is effected, on channel C. Thus, by spacing the interrogation confirming slots at half second positions throughout the sweep there will be confirmation of any information received on an alternate channel.

If by any chance synchronisation of the pedestal pulses and the computer is lost, the computer can delay the pedestal step and can automatically, in three sweeps regain synchronisation.

As previously indicated, the type of alarm units may well vary.

Figure 3:
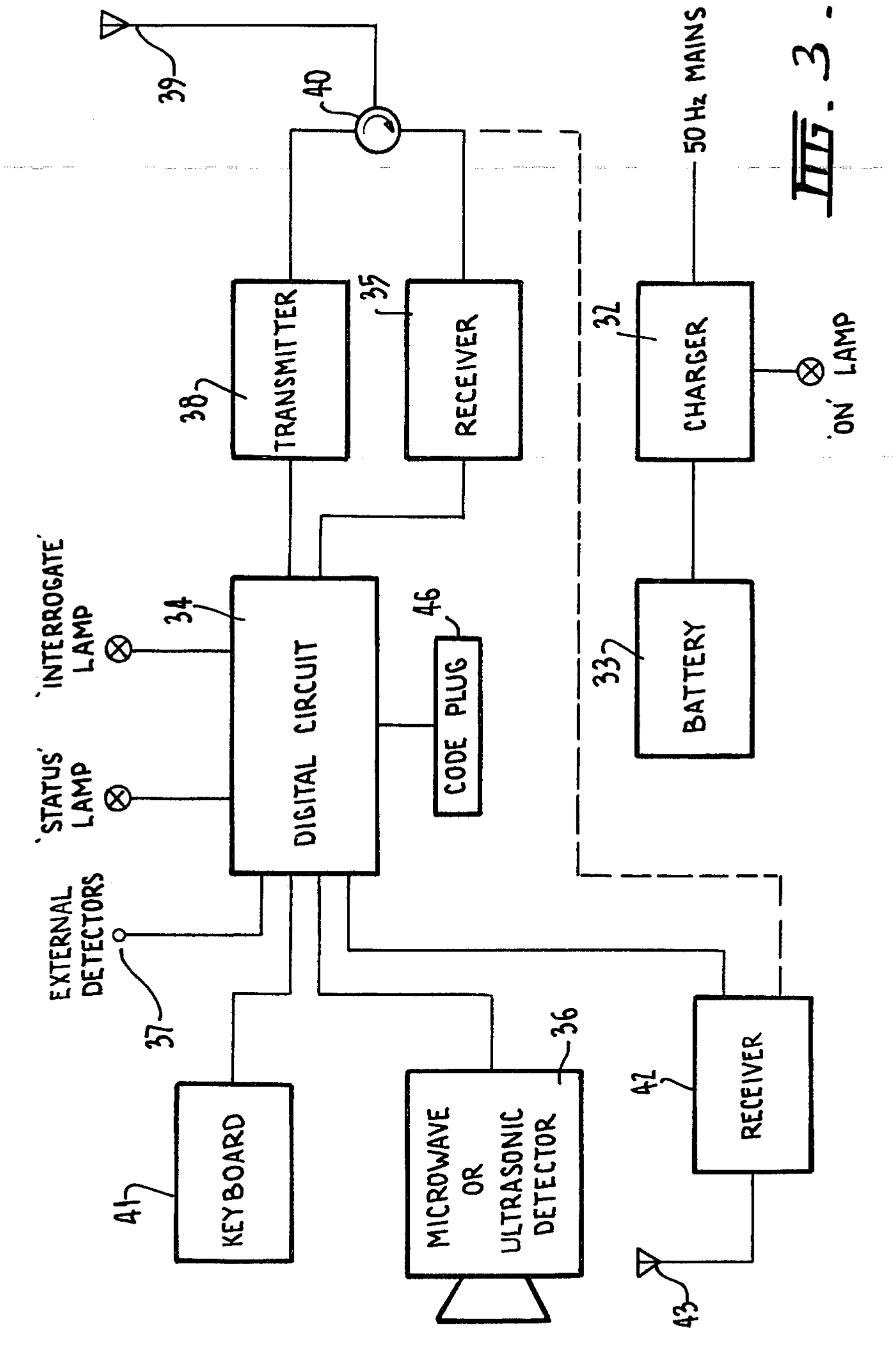
FIG. 3 shows the arrangement of an alarm unit which also has facility for receiving a signal from a mobile transmitter.

The form illustrated in FIG. 3 has most of the functions but the simplest form would have only one detector, say detector 36, no external detectors 37 and no additional receiver 42.

One form, not illustrated, can have a number of slave units and acts as a relay as well as a standard unit and in this form the slave units would forward their signals to the digital circuit 34 and the status of these would be held in memory for the next transmission which may be done on a channel different to those previously referred, say channel E.

The form of alarm unit which is to be used for radio location purposes has a receiver 42 which is on channel D. The purpose of this receiver is to detect the presence of a signal from small mobile transmitters for location purposes. Should one of the alarm units detect the presence of a signal from one of these transmitters, this is fed to the digital circuit 34 and the information is transmitted to the computer through the base along with the normal reply from the unit. A group of particular alarm units in the area concerned can all be provided with identical codes when this function is required and the computer then interrogates the whole of the group regarding the signal from the mobile transmitter and the units can time receipt of say, the leading edge of a burst of signals from the mobile transmitter, turn this into a transmittable signal and transmit this to the computer. The computer can distinguish between the differences in time in which the signal was received at the receivers 42 and from this a triangulation can be achieved which will closely locate the location of the mobile transmitter.

It is anticipated that there would be a large number of alarm units having receivers 42 so the size and power of the mobile transmitter can be extremely small as its range need only be small and thus it could, say, be carried in a courier's brief case or even in a bundle of notes without being at all obvious.

These mobile transmitters can be initiated manually, on movement or can be commanded to transmit by the computer.

I may provide some slots which do not require a reply on interrogation but which are quiescent and will only reply when within the area of a base station. This can be useful on, say, vehicles which move out of range of base stations, say interstate vehicles.

The system can also be used to enable a customer to monitor its own alarm unit.

To do this when an alarm signal is received by the computer of the system it is immediately transmitted by radio to a terminal compatable with the system located on the client's premises.

This facility can either be provided full time or when the user's computer terminal is manned at which time the computer of the invention can be used for the monitoring system or, alternatively, both can monitor at the same time.

I claim:

1. A computer controlled radio activated security and safety system for interrogating a plurality of locations sequentially and obtaining replies to indicate the condition of the locations and which is completely independent of any external transmission means comprising:

a computer centre, at least one main transmitting and main receiving station and at least one remote alarm unit independent of any transmission means associated with said main transmitting and said main receiving station and adapted to monitor a predetermined parameter, said remote alarm unit also including at least one receiver and transmitter, said computer centre being adapted to interrogate said alarm unit with a predetermined digital signal and on command said alarm unit will indicate normal or false conditions and to monitor its reply, the reply being modified on any variation in the parameter.

2. A system as claimed in claim 1 wherein the transmitter, receivers, and power supplies for the computer centre and base station (s) are duplicated.

3. A system as claimed in claim 2 wherein each alarm unit in a particular area has an address code other than its normal address code so that the units can be contacted at the same time so that the variation in the time of receipt of the leading edge of a burst of signal of the mobile transmitter can be coded and sent to the computer which can identify the time variations and from these triangulate the position of the mobile transmitter.

4. A system as claimed in claim 1 wherein the alarm units may be selected from the group comprised of interrogation and reply alarm units, relay interrogation and reply alarm units to act with slave alarm units, and those having an additional receiver to radio locate other units.

5. A system as claimed in claim 1 wherein the computer is adapted to repeatedly sweep a predetermined number of interrogation positions to interrogate the interrogation positions sequentially so that selected ones of the interrogation positions return a signal, which control different computer functions.

6. A system as claimed in claim 1 also having at least one spaced base station which can receive the signal from the main station and re-radiate this for reception by alarm units too distance from the main station to receive its signal.

7. A system as claimed in claim 6 wherein the signal to the base station not only includes the address of the alarm unit but also directions as to which one of a number of directional aerials should be used for the transmission.

8. A system as claimed in claim 1 wherein the computer interrogates each alarm unit by means of radio digital transmissions addressed, either by the main station or a base station, to particular alarm units and the alarm units concerned return a status signal depending on the condition of the parameter monitoring device, should the computer detect that an alarm has been raised the necessary information is displayed.

9. A system as claimed in claim 1 wherein the computer is adapted to repeatedly sweep a predetermined number of interrogation positions, slots, which control different computer functions.

10. A system as claimed in claim 9 wherein the use of slots can be selected from directing interrogation of transponders, changing channels and verifying on an alternate channel of the existence of an alarm condition or a system fault, division into a number of different alarms and the variation of necessary interrogations between day and night.

11. A system as claimed in claim 9 wherein the sweep can manually be delayed by a predetermined time.

12. A system as claimed in claim 11 wherein each alarm unit is provided with a pedestal stepping circuit the rate of stepping of which is equal to the computer sweep delay so the delay can be used to move to a different slot and thereby another channel.

13. A system as claimed in claim 12 wherein the computer is provided with means to delay the stepping of the pedestal stepping circuit to ensure the alarm units are held in synchronization with the computer.

* * * * *